United States Patent
Krause et al.

(10) Patent No.: US 8,075,316 B2
(45) Date of Patent: Dec. 13, 2011

(54) TOOTHBRUSHING TIMER APPARATUS AND METHOD OF USING SAME

(76) Inventors: Richard Thomas Krause, Brighton, MI (US); Tonya Lynn Krause, Brighton, MI (US)

( * ) Notice: Subject to any disclaimer, the term of this patent is extended or adjusted under 35 U.S.C. 154(b) by 531 days.

(21) Appl. No.: 12/284,496

(22) Filed: Sep. 23, 2008

(65) Prior Publication Data

US 2010/0075286 A1    Mar. 25, 2010

(51) Int. Cl.
*G09B 19/00* (2006.01)
(52) U.S. Cl. .......................... 434/263; 434/262; 446/268
(58) Field of Classification Search .................. 434/263, 434/262; 446/268
See application file for complete search history.

(56) References Cited

U.S. PATENT DOCUMENTS

| | | | |
|---|---|---|---|
| 4,096,645 A * | 6/1978 | Mandl | 434/185 |
| 4,435,163 A * | 3/1984 | Schmitt et al. | 434/263 |
| 4,934,940 A | 6/1990 | Savery | |
| 5,259,086 A | 11/1993 | Fong | |
| 5,438,726 A | 8/1995 | Leite | |
| 5,570,325 A * | 10/1996 | Arpadi | 368/10 |
| 5,810,601 A | 9/1998 | Williams | |
| 5,944,531 A * | 8/1999 | Foley et al. | 434/263 |
| 6,926,532 B1 | 8/2005 | Brattesani | |
| 7,013,522 B2 | 3/2006 | Kumagai | |

* cited by examiner

*Primary Examiner* — Xuan Thai
*Assistant Examiner* — Banafsheh Hadizonooz

(57) ABSTRACT

An apparatus for indicating a duration of time for brushing designated teeth and specific portions thereof has a tooth carrying body including an upper tooth carrying structure and a lower tooth carrying structure. The tooth carrying structures are in spaced apart relation with respect to each other in a manner whereby the tooth carrying structure resembles dental gums in a fully or partially open orientation. A first set of tooth-shaped bodies is attached to the upper tooth carrying structure and a second set of the tooth-shaped bodies is attached to the lower tooth carrying structure. Each one of the tooth-shaped bodies includes at least two discretely illuminatable portions. Each one of the discretely illuminatable portions has a respective selectively activatable light output device coupled thereto for allowing each one of the discretely illuminatable portions to be selectively illuminated.

15 Claims, 2 Drawing Sheets

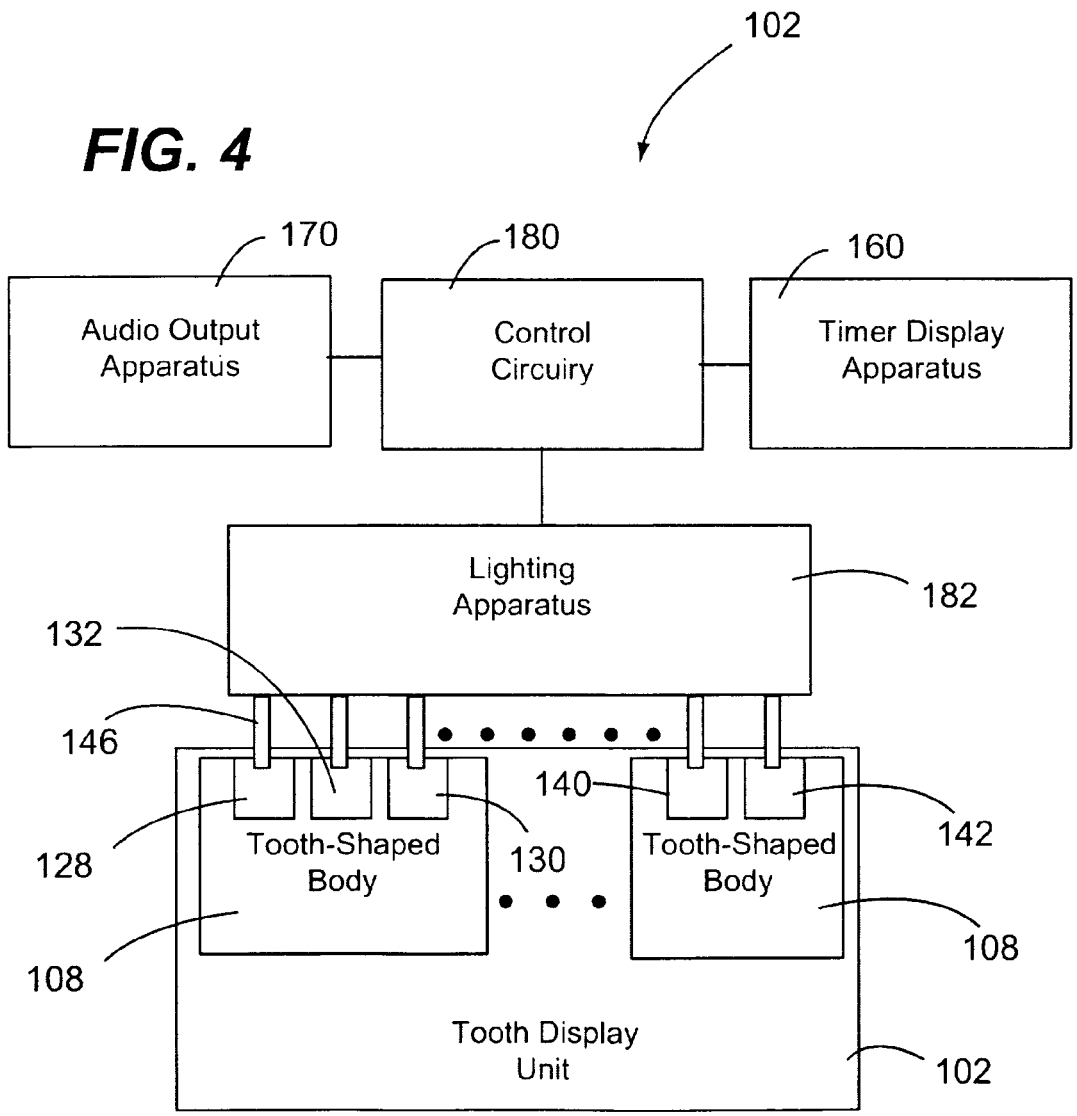

TOOTHBRUSHING TIMER APPARATUS AND METHOD OF USING SAME

FIELD OF THE DISCLOSURE

The disclosures made herein relate generally to implements for facilitating brushing of teeth and, more particularly, to implements for visually and/or audibly indicating a recommended duration of time that individual teeth or collections of teeth should be brushed during a toothbrushing session.

BACKGROUND

Proper brushing of teeth is an essential component of healthy oral hygiene. A major cause of the development of cavities is the presence of dental plaque. Plaque is systematically formed on tooth surfaces between brushings. If tooth brushings are inadequate, dental plaque can accumulate on tooth surfaces as well as within interdental spaces. Such accumulations of plaque from inadequate brushing can lead to bacterial growth that may form acids that destroy the protective enamel of the teeth thereby forming cavities. Improper oral hygiene is also a contributing factor in the development of many periodontal diseases. Accordingly, the proper brush stroke technique, duration and location of tooth brushing efforts are important in the maintenance of good oral hygiene.

Although the benefits of brushing one's teeth are widely recognized, children and adults alike do not always appreciate such benefits. Thus, it is frequently difficult to get such people to brush as frequently as desirable and to brush for a therapeutic length of time. Some people neglect proper brushing because they dislike the practice while others simply forget to do it. As a result, these people often only brush their teeth reluctantly as a result of coercion by a person such as, for example, a parent, a spouse, a dentist, etc.

Many people have not received adequate instruction concerning the proper techniques and duration of toothbrushing so as to properly eliminate plaque from tooth surfaces during each brushing session. Common brushing problems include the placement of the brush head on the tooth and gum surfaces and performing the brushing for a proper duration of time. In particular, many people spend an insufficient amount of time brushing lingual or palatal surfaces of the teeth and focus mainly on the facial surfaces. In addition, incisor and canine teeth often receive more attention than the molars and bicuspids (i.e., pre-molars). In order for the effects of brushing to meet the standards of proper oral hygiene, each surface of one's teeth, including the facial and palatal (for the upper teeth), facial and lingual (for the lower teeth), and the occlusal surface, must receive ample brushing time. Additionally, each of the different types of teeth, including the incisors, canines, bicuspids and molars also must receive ample brushing time.

Prior attempts to provide a teaching mechanism for providing proper instruction on toothbrushing technique, however, have concentrated primarily on the overall duration of the brushing process. They have not attempted to solve the problem of proper coverage of all teeth and surfaces of teeth in the mouth, including properly balancing the overall brushing time between each type and surface of tooth in the mouth. Known apparatuses and devices for indicating duration of brushing time and/or location of where to brush do not provide an effective means for inducing a person to brush specific one of their teeth or groups of their teeth for a recommended prescribed period of time.

Therefore, an apparatus and corresponding method of use that overcomes drawbacks associated with conventional approaches for providing instruction on toothbrushing technique and that provides an effective means for inducing a person to brush specific teeth or groups of their teeth for a recommended prescribed duration of time would be advantageous, desirable and useful.

SUMMARY OF THE DISCLOSURE

Embodiments of the present invention relate to approaches for providing instruction on toothbrushing technique in a manner that overcomes drawbacks associated with conventional approaches. More specifically, embodiments of the present invention provide an effective means for inducing a person to brush specific teeth or groups of their teeth for a recommended prescribed duration of time using an advantageous implementations of visual and/or audible means. In doing so, embodiments of the present invention advantageously overcome one or more shortcomings associated with conventional approaches for providing instruction on toothbrushing technique.

In one embodiment of the present invention, an apparatus for indicating a duration of time for brushing designated teeth and specific portions thereof comprises a tooth carrying body, a plurality of selectively activatable light output devices and a plurality of tooth-shaped bodies attached to the tooth carrying structures. The tooth carrying body has an upper tooth carrying structure and a lower tooth carrying structure. The tooth carrying structures are in spaced apart relation with respect to each other in a manner whereby the tooth carrying structure resembles dental gums in a fully or partially open orientation. A first set of the tooth-shaped bodies is attached to the upper tooth carrying structure and a second set of the tooth-shaped bodies is attached to the lower tooth carrying structure. Each one of the tooth-shaped bodies includes at least two discretely illuminatable portions. Each one of the discretely illuminatable portions has a respective one of the selectively activatable light output devices coupled thereto for allowing each one of the discretely illuminatable portions to be selectively illuminated.

In another embodiment of the present invention, a tooth brushing timer system comprises a tooth display unit and a lighting apparatus. The tooth display unit includes a tooth carrying body having a plurality of tooth-shaped bodies mounted thereon. The tooth carrying body and the tooth-shaped bodies are jointly configured in a manner whereby the tooth carrying body and the tooth-shaped bodies resemble a mouth in a partially or fully open orientation with a first set of the tooth-shaped bodies attached to an upper dental gum and a second set of the tooth-shaped bodies attached to a lower dental gum. Each one of the tooth-shaped bodies includes at least two discretely illuminatable portions. The lighting apparatus is coupled to the discretely illuminatable portions of each one of the tooth-shaped bodies. The lighting apparatus is configured to selectively cause the discretely illuminatable portions to be selectively illuminated for a prescribed duration of time in a prescribed sequence. The lighting apparatus outputs light of varying color such that during activation thereof the discretely illuminatable portions of the tooth-shaped bodies change from a first color to a second color during a respective prescribed duration of time.

In another embodiment of the present invention, a method for indicating a duration of time for brushing designated teeth and specific portions thereof comprises a plurality of operations. An operation is performed for receiving a signal initializing a tooth brushing session. The signal is received by a lighting apparatus coupled to discretely illuminatable portions of tooth-shaped bodies mounted within a tooth display unit configured in a manner whereby a tooth carrying body of the tooth display unit and the tooth-shaped bodies resemble a mouth in a partially or fully open orientation with a first set of the tooth shaped bodies attached to an upper dental gum and a second set of the tooth shaped bodies attached to a lower dental gum. Each one of the tooth shaped bodies includes a plurality of discretely illuminatable portions. In response to receiving the signal, an operation is performed for illuminating a first one of the illuminatable portions of at least one of the tooth-shaped bodies for a first prescribed duration of time in response to receiving the signal. Illuminating the first illuminatable portions includes outputting light of varying color such that during illumination thereof the first illuminatable portions changes from a first color to a second color during the first prescribed duration of time. An operation is performed for illuminating a second one of the illuminatable portions of the at least one tooth shaped body for a second prescribed duration of time after the first prescribed duration of time elapses and in accordance with a prescribed sequence of illuminating the discretely illuminatable portions thereof. Illuminating the second illuminatable portions includes outputting light of varying color such that during illumination thereof the second illuminatable portions changes from a first color to a second color during the second prescribed duration of time.

These and other objects, embodiments, advantages and/or distinctions of the present invention will become readily apparent upon further review of the following specification, associated drawings and appended claims.

BRIEF DESCRIPTION OF THE DRAWINGS

FIG. 4 is a diagrammatic view showing functional components of the toothbrushing timer shown in FIG. 1.

DETAILED DESCRIPTION OF THE DRAWING FIGURES

Figure 1:
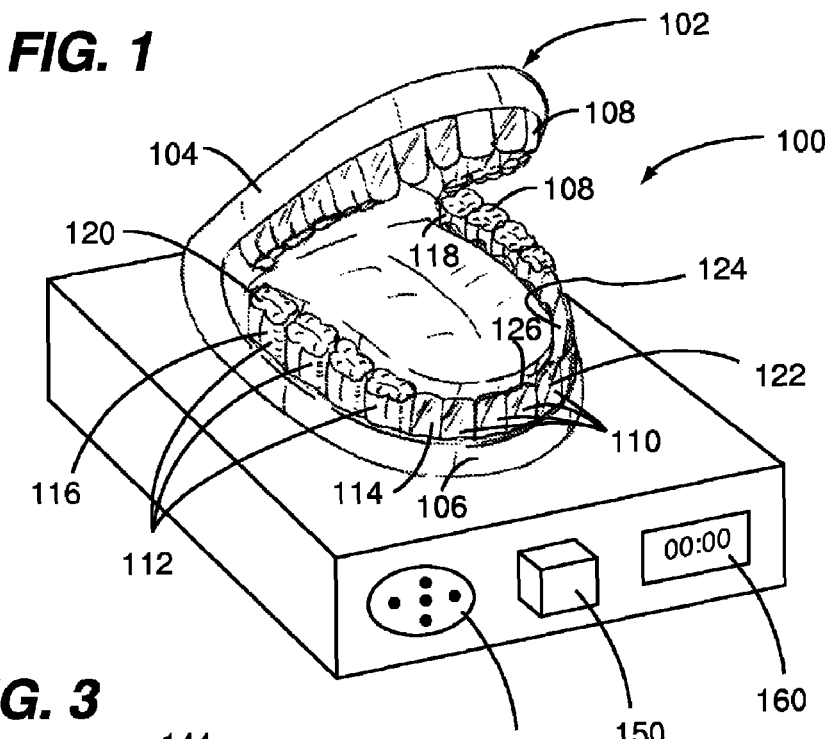
FIG. 1 is a perspective view of a toothbrushing timer in accordance with an embodiment of the present invention.

Referring to FIG. 1, an apparatus 100 in accordance with the present invention is shown. The apparatus 100, which is referred to herein as a tooth brushing timer 100, is configured for visually and/or audibly indicating a duration of time for brushing designated teeth and specific portions thereof. Advantageously, as will be gathered from the ensuing discussion, a tooth brushing timer configured in accordance with the present invention overcomes drawbacks associated with conventional approaches for providing instruction on toothbrushing technique and provides an effective means for inducing a person to brush specific teeth or groups of their teeth for a recommended prescribed duration of time.

The toothbrushing timer 100 includes a tooth display unit 102. The tooth display unit 102 includes an upper tooth carrying structure 104 and a lower tooth carrying body 106. The upper and lower tooth carrying structures 104, 106 are in spaced apart relation with respect to each other in a manner whereby the upper and lower tooth carrying structures 104, 106 resembles a mouth in a partially or fully open orientation with a first set of the tooth-shaped bodies attached to an upper dental gum and a second set of the tooth-shaped bodies attached to a lower dental gum. The upper and lower tooth carrying structures 104, 106 jointly define a tooth carrying body. The upper and lower tooth carrying bodies 104, 106 each have a plurality of tooth-shaped bodies 108 mounted thereon. A first set of the tooth-shaped bodies 108 is attached to the upper tooth carrying structure 104 and a second set of the tooth-shaped bodies 108 is attached to the lower tooth carrying structure 106.

In one embodiment, each set of tooth-shaped bodies includes a plurality of different types of teeth. In one specific embodiment, each set of the tooth-shaped bodies 108 includes a group of adjacent incisor teeth 110, a group of adjacent molar teeth 112 (i.e., including premolars) and at least one canine tooth 114 between the incisor and molar groups of teeth 110, 112. The molar teeth 112 have an outward facing surface 116, an inward facing surface 118 and a top surface 120 (i.e., a biting/crushing face) extending therebetween. The incisor teeth 110 and canine teeth 114 have an outward facing surface 122 and an inward facing surface 124 that converge at a top edge 126 (i.e., a slicing/piecing edge).

Figure 2:
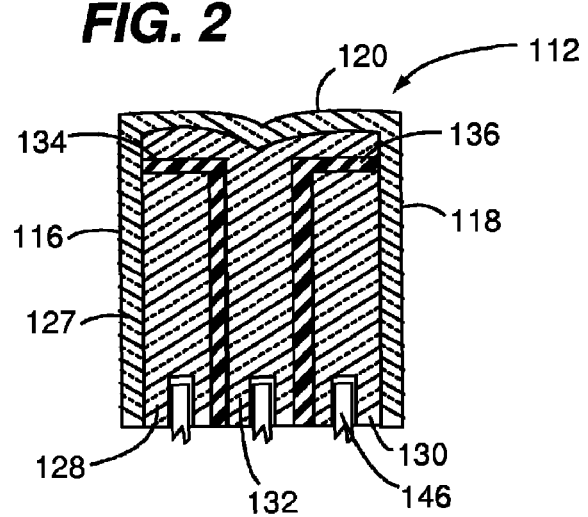
FIG. 2 is a cross sectional of a molar tooth of the toothbrushing timer shown in FIG. 1.

Referring now to FIG. 2, each one of the molar teeth 112 includes three discretely illuminatable portions. Each one of the molar teeth 112 includes a molar shell 127 having a cavity therein. Within the molar shell cavity, each one of the molar teeth 112 includes a first discretely illuminatable portion 128 proximate a wall of the molar shell 127 defining its outward facing surface 116, a second discretely illuminatable portion 130 proximate a wall of the molar shell 127 defining its inward facing surface 118, and a third discretely illuminatable portion 132 proximate a wall of the molar shell 127 defining its top surface 120. A first light barrier 134 is disposed between the first and second discretely illuminatable portions 128, 130 and a second light barrier 136 is disposed between the second and third discretely illuminatable portions 130, 132. The molar shell 127 and the illuminatable portions 128, 130, 132 are light transmissive (e.g., transparent, translucent or the like). Each one of the light barriers 134, 136 is configured to limit light emitted by a respective one of the discretely illuminatable portions from substantially illuminating a respective adjacent one of the discretely illuminatable portions such that an illuminated one of the discretely illuminatable portions thereof and a non-illuminated one of the discretely illuminatable portions thereof are visually distinguishable by such illumination.

Figure 3:
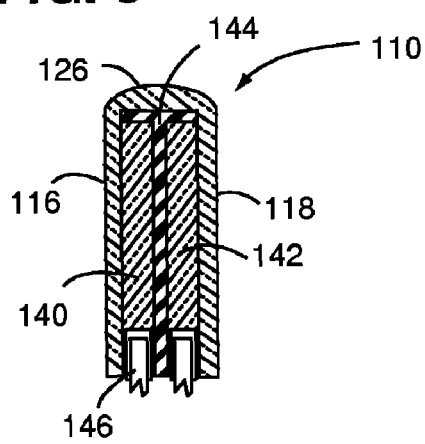
FIG. 3 is a cross sectional of an incisor tooth of the toothbrushing timer shown in FIG. 1.

Referring to FIG. 3, each one of the incisor teeth 110 (and canine teeth, which are of substantially the same functional construction as the incisor teeth 110) includes two discretely illuminatable portions. Each one of the incisor teeth 110 includes an incisor shell 138 having a cavity therein. Within the incisor shell cavity, each one of the incisor teeth 110 includes a first discretely illuminatable portion 140 proximate a wall of the incisor shell 138 defining its outward facing surface 116 and a second discretely illuminatable portion 142 proximate a wall of the incisor shell 138 defining its inward facing surface 118. A light barrier 144 is disposed between the first and second discretely illuminatable portions 140, 142 The incisor shell 138 and the illuminatable portions 140, 142 are light transmissive (e.g., transparent, translucent or the like). The light barrier 144 is configured to limit light emitted by a respective one of the discretely illuminatable portions from substantially illuminating a respective adjacent one of the discretely illuminatable portions such that an illuminated one of the discretely illuminatable portions thereof and a non-illuminated one of the discretely illuminatable portions thereof are visually distinguishable by such illumination.

Examples of the light barriers are pigmented plastic bodies, light reflective film and the like. In one specific embodiment, the light barriers are pigmented plastic bodies disposed between adjacent ones of the illuminatable portions. In another specific embodiment, the light barriers are plastic film disposed between adjacent ones of the illuminatable portions.

As shown in FIGS. 2 and 3, each one of the illuminatable portions has a selectively activatable light output device 146 physically and/or optically coupled thereto. Each selectively activatable light output device 146 is coupled in such a manner that causes an associated illuminatable portion to become illuminated when the associated selectively activatable light output device 146 is activated. In one embodiment, all or some of the selectively activatable light output devices 146 are light emitting diodes (LED) directly coupled to the associated illuminatable portion (e.g., disposed within a cavity of the associated illuminatable portion). In another embodiment, all or some of the selectively activatable light output devices 146 include light transmitting fibers directly coupled to the associated illuminatable portion at a first end portion thereof (e.g., disposed within a cavity of the associated illuminatable portion) and coupled to a light emitting device (e.g., LED) at a second end portion thereof. In such an embodiment, all of a portion of the LED's can be located at a remote location with respect to the associated light emitting device.

In operation, an activation signal (e.g., voltage associated with an open circuit becoming a closed circuit) is issued in response to selecting (e.g., depressing) an activation selector 150. In response to control circuitry of the toothbrushing timer 100 receiving the activation signal, a first one of the illuminatable portions of one or more of the tooth-shaped bodies 108 is illuminated for a first prescribed duration of time and a second one of the illuminatable portions of such tooth-shaped bodies 108 is illuminated for a second prescribed duration of time after the first prescribed duration of time elapses and in accordance with a prescribed sequence of illuminating the discretely illuminatable portions of the tooth shaped bodies. For example, the outward-positioned illuminatable portions of all of the molar teeth 112 on one side of the upper tooth carrying structure 104 are illuminated for the first prescribed duration of time and a second one of the illuminatable portions of such molar teeth 112 are illuminated for a second prescribed duration of time after the first prescribed duration of time elapses and in accordance with a prescribed sequence of illuminating such discretely illuminatable portions thereof. In at least one embodiment, illuminating the illuminatable portions includes outputting light of varying color such that, during illumination of such illuminatable portions during each prescribed duration of time, the light changes from a first color to a second color.

The tooth display unit 102 can also include a tongue-shaped body 176, which can also be selectively illuminatable. Cleaning of the tongue plays a significant role in good oral hygiene. As such, integrated instruction of bushing of the tongue in a manner consistent with the disclosures made herein is advantageous.

In a preferred embodiment of prescribed sequence of illuminating, the objective is to provide smooth transition from one group of teeth being brushed to the next. In this manner, teeth are illuminated in a sequence such that, for a person using illumination of the tooth-shaped bodies as a guide to bushing sequence and duration, such brushing of teeth is carried out in an orderly, predictable and preferred sequence whereby the probability of neglecting to brush teeth during brushing is reduced and brushing overlaps from one group of teeth to the next. For example, illumination can start with the outward-facing surface of molars on one side of the upper tooth carrying structure, transition to the canine and incisor teeth and then to the molars on the other side of the upper tooth carrying structure. This same sequence applies for the outward facing teeth of the lower tooth carrying structure. The same sequence is carried out for the inward facing teeth of the upper and lower tooth carrying structures. Additionally, top surfaces of the molar teeth are illuminated in similar sequence.

In one embodiment, the toothbrushing timer 100 includes a timer display apparatus 160 (e.g., LED) and an audio output device 170 (e.g., speaker). The toothbrushing timer 100 is configured to visually show on the timer display apparatus 160 an elapsed period of time corresponding to a respective prescribed duration of time and to output via the audio output device 170 audio content corresponding to the respective prescribed duration of time. In this manner, the toothbrushing timer 100 is configured to display a remaining portion of a duration of time for brushing and to output audio content (e.g., music) during such duration of time. The audio content is preferably specific and/or dependent upon the duration of time such that each duration of time has respective audio content (i.e., different audio content, or reply of common audio content). It is disclosed herein that the audio content can also include audio (i.e., spoken) instructions for flossing and the like.

It is well known that boredom and tedium are two of the primary reasons that people do not spend sufficient time brushing their teeth. Accordingly, a distraction that alleviates such boredom and/or tedium is generally useful and desirable. Outputting audio content via the audio output device 170 and attached audio circuitry (e.g., MP3 player circuitry, CD player circuitry, and the like) is one such means for alleviates such boredom and/or tedium. Audio content such as music can be outputted in a manner that distracts a user of the toothbrushing timer 100, thereby making it less demanding for the user to brush their teeth for longer periods of time. In one embodiment, a single instance of audio content (e.g., a single song) can be played over the duration of operation of the tooth display unit 102 (e.g., including its output being repeated a number of times). In another embodiment, a plurality of different audio content (e.g., songs) can be played over the duration of operation of the tooth display unit 102. For example, such plurality of songs can be synchronized with operation of the tooth display unit 102 such that different audio content (e.g., a full song or portion of a song) is outputted only during illumination of a particular one or group of the discretely illuminatable portions of the tooth-shaped bodies. In this manner, the audio output and illumination the user is presented with different audio content each time the user is audibly and/or visually instructed to begin brushing a different one or set of teeth. It is disclosed herein that the audio content can be downloaded to the tooth display unit 102, accessed from a memory device attached to the tooth display unit 102, and/or retrieved from resident memory of the that tooth display unit 102.

Referring now to FIG. 4, a diagrammatic view of the toothbrushing timer 100 is shown. The toothbrushing timer 100 includes a control circuitry 180 that control and/or causes the illumination, audio and/or timing functionalities described above. To this end, the control circuitry 180 is coupled to the audio output apparatus 170, to the timer display apparatus 160 and to a lighting apparatus 182. The lighting apparatus 182 provides for selective illumination of the tooth shaped bodies 108 via actuation of the selectively activatable light output devices 146. In one embodiment, the lighting apparatus 182 includes a plurality of light emitting diodes.

The control circuitry 180 can be configured and constructed in any number of manners. The control circuitry 180 is limited only by the functionality that it provides as opposed to its design, construction or configuration. Preferably, but not necessarily, the control circuitry will be constructed using integrated circuit components (e.g., surface mounted components) mounted on a printed circuit board, flexible circuit or the like.

Accordingly, the present invention is directed to a tooth brushing toothbrush timer which is capable of presenting an amusing visual and/or informational representation of the time required for a person to brush his or her teeth. The toothbrush timer captures the attention of the user by providing an entertaining face having color-changing teeth in which the teeth change between two distinct colors. When the toothbrush timer is activated, the tooth-shaped bodies gradually transform from, for example, a non-white color to white over a predetermined period of time. Such a novel device continuously provides the user with visual feedback relating to the time period for brushing his or her teeth. In particular, the ratio of the two colors covering the teeth and/or the rate of color change is proportionate to the ratio of the time expired and time remaining for the tooth brushing operation. Thus, by knowing the time remaining for the tooth brushing operation (e.g., via audio and/or visual means), a person brushing can pace himself or herself for brushing each portion of their mouth and anxiously anticipate the moment when the tooth brushing operation will end.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An apparatus for indicating a duration of time for brushing designated teeth and specific portions thereof, comprising:
   a tooth carrying body having an upper tooth carrying structure and a lower tooth carrying structure, wherein said tooth carrying structures are in spaced apart relation with respect to each other in a manner whereby said tooth carrying structures resembles dental gums in a fully or partially open orientation;
   a plurality of selectively activatable light output devices;
   a plurality of tooth-shaped bodies attached to said tooth carrying structures, wherein a first set of said tooth-shaped bodies is attached to the upper tooth carrying structure and a second set of said tooth-shaped bodies is attached to the lower tooth carrying structure, wherein each one of said tooth-shaped bodies includes at least two discretely illuminatable portions, wherein each one of said discretely illuminatable portions has a respective one of said selectively activatable light output devices coupled thereto for allowing each one of said discretely illuminatable portions to be selectively illuminated, wherein each one of said tooth-shaped bodies includes a light transmissive shell having said at least two discretely illuminatable portions mounted within a cavity thereof, wherein the light transmissive shell of each one of said tooth-shaped bodies includes exterior surfaces jointly configured to define a representation of at least one of an incisor tooth, a molar tooth, and a canine tooth, each one of said tooth-shaped bodies includes a light barrier between each one of said at least two said discretely illuminatable portions thereof, and wherein the light barrier of each one of said tooth-shaped bodies limits light emitted by one of said discretely illuminatable portions thereof from substantially illuminating an adjacent one of said discretely illuminatable portions thereof such that an illuminated one of said discretely illuminatable portions thereof and a non-illuminated one of said discretely illuminatable portions thereof are visually distinguishable by said illumination; and
   an audio output device coupled to all of said activatable light output devices, wherein the audio output device outputs audio content dependent upon which ones of said activatable light output devices are activated for outputting light, wherein a first collection of said activatable light output devices is illuminated for a first prescribed period of time, wherein a second collection of said activatable light output devices is illuminated for a second prescribed period of time different than the first prescribed period of time, wherein the audio output device outputs first audio content during the first period of time and second audio content during the second period of time, wherein said first audio content includes a first song having been downloaded to memory of the apparatus, and wherein the second audio content includes a second song having been downloaded to said memory of the apparatus.

2. The apparatus of claim 1 wherein each one of said light output devices is configured to output light of varying color such that during illumination thereof a respective one of said discretely illuminatable portions changes from a first color to a second color during a prescribed duration of time.

3. The apparatus of claim 1 wherein:
   a first one of said discretely illuminatable portions of each one of said tooth-shaped bodies is adjacent to an outwardly facing side surface of the light transmissive shell thereof; and
   a second one of said discretely illuminatable portions of each one of said tooth-shaped bodies is adjacent to an inwardly facing side surface of the light transmissive shell thereof.

4. The apparatus of claim 1 wherein:
   a first one of said tooth-shaped bodies has two discretely illuminatable portions;
   a second one of said tooth-shaped bodies has three discretely illuminatable portions;
   an outwardly facing side surface of the light transmissive shell of the first one of said tooth-shaped bodies is adjacent to a first one of said discretely illuminatable portions thereof and an inwardly facing side surface of the light transmissive shell of the first one of said tooth-shaped bodies is adjacent to a second one of said discretely illuminatable portions thereof; and
   an outwardly facing side surface of the light transmissive shell of the second one of said tooth-shaped bodies is adjacent to a first one of said discretely illuminatable portions thereof, an inwardly facing side surface of the light transmissive shell of the second one of said tooth-shaped bodies is adjacent to a second one of said discretely illuminatable portions thereof, and a surface of the light transmissive shell of the second one of said tooth-shaped bodies extending between said inwardly facing and outwardly facing side surfaces thereof is a third one of said discretely illuminatable portions thereof.

5. The apparatus of claim 4 wherein:
each one of said tooth-shaped bodies includes a light barrier between each one of said at least two said discretely illuminatable portions thereof; and
the light barrier of each one of said tooth-shaped bodies limits light emitted by the first one of said discretely illuminatable portions thereof from substantially illuminating the first one of said discretely illuminatable portions thereof such that an illuminated one of said discretely illuminatable portions thereof and a non-illuminated one of said discretely illuminatable portions thereof are visually distinguishable by said illumination.

6. The apparatus of claim 5 wherein:
each one of said selectively activatable light output devices includes at least one of a light emitting diode and a light transmitting fiber; and
each one of said light output devices is configured to output light of varying color such that during illumination thereof a respective one of said discretely illuminatable portions changes from a first color to a second color during a prescribed duration of time.

7. The apparatus of claim 1 wherein:
said first audio content includes a first song having been downloaded to memory of the apparatus, and
the second audio content includes a second song having been downloaded to said memory of the apparatus.

8. The apparatus of claim 7, further comprising:
a timer coupled to said activatable light output devices and configured to visually show an elapsed period of time corresponding to a respective one of said prescribed periods of time during the respective one of said prescribed periods of time.

9. A tooth brushing timer system, comprising:
a tooth display unit including a tooth carrying body having a plurality of tooth-shaped bodies mounted thereon and a tongue-shaped body mounted therein, wherein the tooth carrying body, the tongue-shaped body, and said tooth-shaped bodies are jointly configured in a manner whereby the tooth carrying body and said tooth-shaped bodies jointly resemble a mouth in a partially or fully open orientation with a first set of said tooth-shaped bodies attached to an upper dental gum, a second set of said tooth-shaped bodies attached to a lower dental gum, and the tongue-shaped body disposed adjacent to the lower dental gum, wherein each one of said tooth-shaped bodies includes a light transmissive shell having at least two discretely illuminatable portions mounted within a cavity thereof, wherein the light transmissive shell of each one of said tooth-shaped bodies includes exterior surfaces jointly configured to define a representation of at least one of an incisor tooth, a molar tooth, and a canine tooth, and wherein the tongue-shaped body is selectively illuminable with respect to said tooth-shaped bodies;
a lighting apparatus coupled to said discretely illuminatable portions of each one of said tooth-shaped bodies, wherein the lighting apparatus is configured to selectively cause said discretely illuminatable portions to be selectively illuminated for a prescribed duration of time in a prescribed sequence and wherein the lighting apparatus outputs light of varying color such that during activation thereof said discretely illuminatable portions of said tooth-shaped bodies change from a first color to a second color during a respective prescribed duration of time; and
an audio output device coupled to all of said activatable light output devices, wherein the audio output device outputs audio content dependent upon which ones of said activatable light output devices are activated for outputting light, wherein a first collection of said activatable light output devices is illuminated for a first prescribed period of time, wherein a second collection of said activatable light output devices is illuminated for a second prescribed period of time different than the first prescribed period of time, and wherein the audio output device outputs first audio content during the first period of time and second audio content during the second period of time.

10. The system of claim 9 wherein:
each one of said tooth-shaped bodies includes a light barrier between each one of said at least two said discretely illuminatable portions thereof; and
the light barrier of each one of said tooth-shaped bodies limits light emitted by a first one of said discretely illuminatable portions thereof from substantially illuminating a second one of said discretely illuminatable portions thereof such that an illuminated one of said discretely illuminatable portions thereof and a non-illuminated one of said discretely illuminatable portions thereof are visually distinguishable by said illumination.

11. The system of claim 10 wherein:
a first one of said tooth-shaped bodies has two discretely illuminatable portions;
a second one of said tooth-shaped bodies has three discretely illuminatable portions;
an outwardly facing side surface of a light transmissive shell of the first one of said tooth-shaped bodies is adjacent to a first one of said discretely illuminatable portions thereof and an inwardly facing side surface of the light transmissive shell of the first one of said tooth-shaped bodies is adjacent to a second one of said discretely illuminatable portions thereof; and
an outwardly facing side surface of a light transmissive shell of the second one of said tooth-shaped bodies is adjacent to a first one of said discretely illuminatable portions thereof, an inwardly facing side surface of the light transmissive shell of the second one of said tooth-shaped bodies is adjacent to a second one of said discretely illuminatable portions thereof, and a surface of the light transmissive shell of the second one of said tooth-shaped bodies extending between said inwardly facing and outwardly facing side surfaces thereof is a third one of said discretely illuminatable portions thereof.

12. The system of claim 11 wherein each one of said selectively activatable light output devices includes at least one of a light emitting diode and a light transmitting fiber.

13. A method for indicating a duration of time for brushing designated tooth-shaped bodies and specific portions thereof, comprising:
receiving a signal initializing a tooth brushing session, wherein the signal is received by a lighting apparatus coupled to discretely ilium inatable portions of tooth-shaped bodies mounted within a tooth display unit configured in a manner whereby a tooth carrying body of the tooth display unit and said tooth-shaped bodies resemble a mouth in a partially or fully open orientation with a first set of said tooth-shaped bodies attached to an upper dental gum and a second set of said tooth-shaped bodies attached to a lower dental gum, and wherein each one of said tooth-shaped bodies includes a light transmissive shell having a plurality of discretely illuminatable portions mounted within a cavity thereof;

illuminating a first one of said illuminatable portions of at least one of said tooth-shaped bodies for a first prescribed duration of time in response to receiving the signal, wherein illuminating said first illuminatable portions includes outputting light of varying color such that during illumination thereof said first illuminatable portions changes from a first color to a second color during the first prescribed duration of time;

illuminating a second one of said illuminatable portions of said at least one tooth-shaped body for a second prescribed duration of time after the first prescribed duration of time elapses and in accordance with a prescribed sequence of illuminating said discretely illuminatable portions thereof, wherein illuminating said second illuminatable portions includes outputting light of varying color such that during illumination thereof said second illuminatable portions changes from a first color to a second color during the second prescribed duration of time; and an audio output device coupled to all of said activatable light output devices, wherein the audio output device outputs audio content dependent upon which ones of said activatable light output devices are activated for outputting light, wherein a first collection of said activatable light output devices is illuminated for a first prescribed period of time, wherein a second collection of said activatable light output devices is illuminated for a second prescribed period of time different than the first prescribed period of time, wherein the audio output device outputs first audio content during the first period of time and second audio content during the second period of time, wherein said first audio content includes a first song having been downloaded to memory of the apparatus, and wherein the second audio content includes a second song having been downloaded to said memory of the apparatus.

14. The method of claim 13 wherein:

each one of said tooth-shaped bodies includes a light barrier between each one of said discretely illuminatable portions thereof;

the light barrier of each one of said tooth-shaped bodies limits light emitted by one of said discretely illuminatable portions thereof from substantially illuminating an adjacent one of said discretely illuminatable portions thereof such that an illuminated one of said discretely illuminatable portions thereof and a non-illuminated one of said discretely illuminatable portions thereof are visually distinguishable by said illumination;

illuminating the first one of said illuminatable portions includes illuminating an illuminatable portion of a first collection of said tooth-shaped bodies for the first prescribed duration of time in response to receiving the signal; and illuminating the second one of said illuminatable portions includes illuminating an illuminatable portion of a second collection of said tooth-shaped bodies for the second prescribed duration of time after the first prescribed duration of time elapses and in accordance with a prescribed sequence of illuminating said discretely illuminatable portions of said tooth-shaped bodies.

15. The method of claim 13 wherein:

each one of said tooth-shaped bodies includes a light barrier between each one of said discretely illuminatable portions thereof;

the light barrier of each one of said tooth-shaped bodies limits light emitted by one of said discretely illuminatable portions thereof from substantially illuminating an adjacent one of said discretely illuminatable portions thereof such that an illuminated one of said discretely illuminatable portions thereof and a non-illuminated one of said discretely illuminatable portions thereof are visually distinguishable by said illumination;

illuminating the first one of said illuminatable portions includes illuminating an illuminatable portion of a first collection of said tooth-shaped bodies for the first prescribed duration of time in response to receiving the signal; and illuminating the second one of said illuminatable portions includes illuminating an illuminatable portion of a second collection of said tooth-shaped bodies for the second prescribed duration of time after the first prescribed duration of time elapses and in accordance with a prescribed sequence of illuminating said discretely illuminatable portions of said tooth-shaped bodies.

* * * * *